United States Patent [19]

Furuhashi

[11] Patent Number: 4,741,907

[45] Date of Patent: May 3, 1988

[54] FRESH DOUGH AND A METHOD FOR PRODUCING THE SAME

[75] Inventor: Toshiaki Furuhashi, Sashima, Japan

[73] Assignee: Asahi Kasei Kogyo Kabushiki Kaisha, Japan

[21] Appl. No.: 809,752

[22] Filed: Dec. 17, 1985

[30] Foreign Application Priority Data

| Dec. 17, 1984 | [JP] | Japan | 59-264632 |
| May 29, 1985 | [JP] | Japan | 60-114260 |
| Jun. 3, 1985 | [JP] | Japan | 60-118952 |
| Jun. 3, 1985 | [JP] | Japan | 60-118953 |

[51] Int. Cl.$^4$ ............................................. A21D 10/02
[52] U.S. Cl. ........................................ 426/90; 426/94; 426/128; 426/275; 426/551; 426/293; 426/297
[58] Field of Search ............... 426/128, 94, 90, 275, 426/551, 293, 297

[56] References Cited

U.S. PATENT DOCUMENTS

| 2,478,618 | 8/1949 | Armstrong et al. | 426/128 X |
| 3,142,573 | 7/1964 | Erekson et al. | 426/94 |
| 3,524,401 | 8/1970 | Hosfield et al. | 426/94 X |
| 3,649,304 | 3/1972 | Fehr, Jr. et al. | 426/128 X |
| 4,381,315 | 4/1983 | Yong et al. | 426/94 |
| 4,388,336 | 6/1983 | Yong et al. | 426/128 X |
| 4,526,801 | 7/1985 | Atwell | 426/128 |

*Primary Examiner*—Joseph Golian
*Attorney, Agent, or Firm*—Berman, Aisenberg & Platt

[57] ABSTRACT

There is disclosed a fresh dough contained in a container for storage and chemically leavened in the container which has a specific structure derived from a laminated structure constituted by a first plurality of layers each containing a leavening base but containing no leavening acid, a second plurality of layers each containing a leavening acid but containing no leavening base, and a third plurality of layers each containing neither leavening acid nor leavening base and disposed between the respective first layers and the respective second layers to prevent direct contact between said respective first layers and said respective second layers. There is also disclosed a fresh dough contained in a container and chemically leavened in the container, which comprises gas cells and a matrix containing a gel dispersed uniformly therein. Such a gel is formed by blending a metal salt with flour and water to form a dough and subsequently blending the dough with a hydrophilic polymer to effect the reaction between the hydrophilic polymer and the metal ion. The fresh dough of the present invention gives a bread having an excellent texture and taste comparable to those of a yeast bread.

12 Claims, No Drawings

FRESH DOUGH AND A METHOD FOR PRODUCING THE SAME

This invention relates to a fresh dough contained in a container for storage and chemically leavened in the container. More particularly, the present invention relates to a chemically leavened fresh dough which is capable of giving a bread having improved taste and texture comparable to those of a yeast bread when the fresh dough is baked. The present invention also relates to a method for producing the fresh dough as mentioned above.

Conventionally, a fresh dough leavened by chemical leaveners, namely: a leavening acid and a leavening base, and contained in a paper container has been widely marketed in United States of America, Europe, etc., and there are known various fresh doughs for biscuits and pastries, such as croissant and danish, and the like. Those fresh doughs are leavened by the action of carbon dioxide gas produced by a reaction between a leavening acid and a leavening base and contained in a paper container, etc., under a pressurized condition, and stored in a refrigerator for several months. Using such a fresh dough, consumers can make a biscuit, etc., easily and simply by opening the container of a fresh dough, taking out the dough from the container and baking it in an oven.

However, fresh dough conventionally available on the market has a disadvantage that, when bread is made of the fresh dough, such bread is inferior to yeast bread in specific volume, texture and the like. Further, conventional fresh dough is prepared with sodium acid pyrophosphate (hereinafter referred to as SAPP) as a leavening acid and, therefore, the bread made with fresh dough has a disadvantage that such bread has an undesirable taste, that is, bitterness inherent in SAPP. In order to eliminate the disadvantage in taste, an attempt has been made to use, as the leavening acid, a mixture of sodium aluminum phosphate (hereinafter often referred to as SALP) and SAPP to reduce the amount of SAPP to be used for producing fresh dough. However, the effect of such an attempt is not satisfactory.

On the other hand, it has been proposed that glucono delta lactone (hereinafter referred to as GDL) be used as leavening acid instead of SAPP. The GDL reacts with a leavening base with formation of sodium gluconate. Sodium gluconate is tasteless. Therefore, GDL is widely used as a leavening acid for a fresh dough (U.S. Pat. No. 2,478,618). However, where the GDL is used, there is a disadvantage that, since the reaction of GDL with a leavening base cannot be controlled once they are contacted with each other, $CO_2$ gas is generated by the reaction of GDL with a leavening base during the steps of producing a fresh dough, causing the blending of dough materials to be insufficient. Therefore, the fresh dough produced is poor in texture and elasticity. When such a fresh dough is packed in a container, the dough cannot keep $CO_2$ gas therein sufficiently. Therefore, the internal pressure of the container is increased and the container is often ruptured. Further, it is undesirable that a bread made of such a fresh dough has a rough cell structure and is inferior in specific volume. Moreover, when fresh dough, e.g. a fresh dough for croissant, is produced with edible oil and fat, such as margarine, rolled therein, $CO_2$ gas is generated in the fresh dough during the step of rolling edible oil and fat in the dough and the generated gas spoils the dough. Bread made from such spoiled dough is inferior in quality. Further, there is a disadvantage that such spoiled dough is difficult to pack in a container due to the presence of $CO_2$ gas in a large volume.

In order to eliminate the above-mentioned drawbacks, there is proposed a fresh dough produced by a method in which a shortening containing at least one of a leavening acid and a leavening base is applied to a flour/water matrix so that at least one of the group of water, a leavening acid and a leavening base is isolated from the remainder of the group, and the thus obtained shortening-coated flour/water matrix is then laminated (U.S. Pat. No. 4,381,315). According to the above-mentioned method, the contact between water, a leavening acid and a leavening base is controlled by means of a shortening to delay the reaction therebetween. However, the above-mentioned method has disadvantages as follows. That is, if the chemical leaveners remain unreacted in the shortening layers of the fresh dough, a bread made of the fresh dough has portions assuming brown color and has bitter taste of the remaining chemical leaveners. In order to prevent the chemical leaveners from remaining unreacted in the shortening layers, it is necessary to make the shortening layers sufficiently thin. It is very troublesome to make the shortening layers sufficiently thin because much time and labor are required for sheeting a dough. Therefore, the productivity of the dough is low. Especially when a fresh dough for pastries, such as croissant, in which an edible oil and fat is rolled, is produced, it is necessary to effect two sheeting processes, that is, the sheeting of shortening-coated flour/water matrixes and the sheeting for rolling an edible oil and fat into the dough. The thus obtained fresh dough has disadvantageously a rough texture and, therefore, a bread made of such a fresh dough assumes bad color and has a small volume.

On the other hand, there has been proposed a method in which a fluid dough, such as a liquid butter for making a cake, is stabilized using a gelling agent, such as a gelatin, so that $CO_2$ gas generated by the reaction between leaveners can be effectively kept or occluded in the dough at low temperatures at which the fluid dough is gelled by the action of the gelling agent (U.S. Pat. No. 3,649,304). However, according to the method, blending of dough materials is effected at about 30° C. at which the reaction between the leaveners readily proceeds and, therefore, the generation of $CO_2$ gas is disadvantageously promoted in the steps involved in the production of a dough so that the texture of the dough becomes rough.

In summary, in producing a fresh dough leavened by chemical leaveners, it is necessary that the generation of $CO_2$ gas be repressed during the steps of blending dough materials, and dividing and forming the blended material in a predetermined shape, and during the step of rolling edible oil and fat into the blended material if pastries are intended to be produced. It is further necessary that immediately after packing a fresh dough in a container, $CO_2$ gas be generated so that a fresh dough is leavened in a container. Of course, the fresh dough is required to be capable of giving, when it is baked, a bread having an excellent texture and taste comparable to those of a yeast bread. However, heretofore, such a fresh dough has not been proposed.

To eliminate the drawbacks of the conventional fresh doughs of the type packed in a container and chemically leavened in the container, the present inventor has made extensive and intensive studies. As a result, it has been found that when a first plurality of layers (each containing leavening base but containing no leavening acid), a second plurality of layers (each containing a leavening acid but containing no leavening base) and a third plurality of layers (each containing no chemical leaveners) are laminated so that the respective third layers intervene between the respective first layers and the respective second layers, the generation of $CO_2$ gas in a dough is effectively controlled during the steps involved in the production of the fresh dough, and after the fresh dough is packed in a container the fresh dough is leavened by the action of the generated $CO_2$ gas to provide a fresh dough which is capable of giving a bread having an excellent texture and taste comparable to those of a yeast bread. It has also been found that a fresh dough, in which a gel formed by the reaction of a hydrophilic polymer with a metal ion is dispersed, has an improved gas-maintaining ability and is capable of giving a bread having an improved texture. The present invention has been made based on such novel findings.

Accordingly, it is an object of the present invention to provide a fresh dough (contained in a container and chemically leavened in the container) which has such excellent properties that a bread obtained by baking the fresh dough has excellent texture and taste comparable to those of a yeast bread.

It is another object of the present invention to provide a method for producing a fresh dough of the kind as mentioned above.

According to the present invention, there is provided a fresh dough contained in a container for storage and chemically leavened in the container, which comprises:

(1) expanded portions which are derived from a first plurality of layers (each containing flour, water and a leavening base, but containing no leavening acid);

(2) unexpanded portions which are derived from a second plurality of layers (each containing a leavening acid, but containing no leavening base); and (3) partially expanded portions which are derived from a third plurality of layers (each containing flour and water, but containing neither leavening acid nor leavening base), said first layers, said second layers and said third layers constituting a laminated structure in which respective third layers intervene between the respective first layers and the respective second layers to prevent direct contact between said respective first layers and said respective second layers.

The fresh dough of the present invention comprises three portions, namely: expanded portions, unexpanded portions and partially expanded portions. The expanded portions are derived from a first plurality of layers (each containing flour, water and a leavening base, but containing no leavening acid). The unexpanded portions are derived from a second plurality of layers (each containing a leavening acid but containing no leavening base). The partially expanded portions are derived from a third plurality of layers (each containing flour and water, but containing neither leavening acid nor leavening base). The first layers, the second layers and the third layers constitute a laminated structure in which the respective third layers intervene between the respective first layers and the respective second layers to prevent direct contact between the respective first layers and the respective second layers. The fresh dough of the present invention is chemically leavened by the action of $CO_2$ gas generated by the reaction between the leavening acid and the leavening base. The reaction of the leavening acid with the leavening base is initiated when the leavening base in the first layers and the leavening acid in the second layers tend to migrate respectively to the second layers and the first layers through the third layers, and the leavening acid and the leavening base are contacted with each other. However, since the migration rate of the leavening acid is extremely higher than that of the leavening base, the reaction is mainly conducted in the first layers. That is, the generation of $CO_2$ gas by the reaction between the leavening acid and the leavening base occurs mainly in the first layers. Therefore, the portions derived from the first layers are expanded by the action of the $CO_2$ gas generated. On the other hand, the leavening base does not reach the second layers because the migration rate of the leavening base is extremely lower than that of the leavening acid and the leavening base is completely reacted with the leavening acid before reaching the second layers. That is, the reaction of the leavening acid with the leavening base does not occur in the second layers. Therefore, the portions derived from the second layers are not expanded because $CO_2$ gas is not generated in the second layers. In the third layers, there is a small amount of the leavening base having migrated from the first layers and such leavening base is reacted with the leavening acid having migrated from the second layers to generate a small amount of $CO_2$ gas. Therefore, the portions derived from the third layers are partially expanded.

As the leavening base contained in the respective first layers, there may be mentioned customary leavening bases, such as sodium hydrogencarbonate, ammonium chloride and ammonium hydrogencarbonate.

As the leavening acid contained in the respective second layers, there may be mentioned organic acids having blander taste, such as malic acid, citric acid, glucono delta lactone, fumaric acid and adipic acid. Of them, glucono delta lactone is preferable from the standpoint of taste and reactivity with a leavening base. Although SAPP has been widely employed in the art because SAPP gradually reacts with a leavening base, SAPP is not preferable because of its bad taste, that is, the so-called "pyro" taste.

Each of the second layers may be of a dough containing flour and water in addition to a leavening acid. Alternatively, each of the second layers may consist of a leavening acid only. In further alternative form, each of the second layers may be of a gel containing at least one hydrophilic polymer, water and a leavening acid. As the hydrophilic polymer, there may be mentioned carboxymethyl cellulose, locust bean gum, tamarind gum, tragacanth gum and carrageenan. Of them, carboxymethyl cellulose is most preferable.

In the case where each of the respective second layers is of a gel, the second layer may further contain a member selected from the group consisting of wheat gluten, microcrystalline cellulose, methyl cellulose, xanthan gum, sodium alginate, gelatin and konjak-mannan, preferably wheat gluten and/or microcrystalline cellulose.

Identification of the respective expanded portions, the respective unexpanded portions and the respective partially expanded portions respectively derived from the first layers, the second layers and the third layers can be performed as follows.

For easy understanding of the following explanation of the identification, an explanation of the structure of the fresh dough of the present invention will be first given. The present fresh dough has a laminate structure composed of expanded portions, partially expanded portions and unexpanded portions. The partially expanded portion comprises a relatively thick unexpanded layer portion adjacent the unexpanded portion and a relatively thin expanded layer portion adjacent the expanded portion, which are distinct. However, both the boundary between the relatively thick unexpanded layer portion of the partially expanded portion and the adjacent unexpanded portion and the boundary between the relatively thin expanded layer portion of the partially expanded portion and the adjacent expanded portion are not distinct. Therefore, when the present fresh dough is cut transversely of the laminate structure of the fresh dough and observed, the cross section of the fresh dough seems to have only two kinds of layers, namely, expanded layers and unexpanded layers. That is, the relatively thick unexpanded layer portion of the partially expanded portion is unified with the adjacent unexpanded portion, and the relatively thin expanded layer portion of the partially expanded portion is unified with the adjacent expanded portion.

With respect to the illustrative manner for the above-mentioned identification, an explanation will now be given. When the present fresh dough having a laminate structure is cut transversely of the laminate structure of the fresh dough and the cross section of the fresh dough is examined through a microscope of 40 to 100 magnifications, there can be distinctly observed expanded layers having a fine cellular structure and unexpanded density layers having no cells. The former contains sodium ions derived from a leavening base in the case where the leavening base is sodium hydrogencarbonate, and contains ammonium ions derived from a leavening base in the case where the leavening base is an ammonium salt such as ammonium chloride and ammonium hydrogencarbonate. Therefore, it can be recognized that the former is derived mainly from the first layers. In this connection, however, if table salt, i.e., sodium chloride is added to the fresh dough, the sodium ion is contained not only in the former but also in the latter. However, the sodium ion content of the former is higher than that of the latter when sodium hydrogencarbonate is used as a leavening base. Therefore, even if table salt is added to the fresh dough, it can be recognized that the former is derived mainly from the first layer containing a leavening base. The sodium ion in the fresh dough may be determined by customary atomic adsorption analysis [see, for example, Shokuhin Bunsekiho (Methods of Food Analysis) edited by the Japanese Society for Food Science and Technology, published by Kohrin, Japan, chapters 7-1 to 7-5, p.257- (1982)]. The ammonium ion in the fresh dough may be determined by a customary method [see, for example, Bunseki Kagaku Binran (Handbook of Analytical Chemistry), edited by the Japanese Society for Analytical Chemistry, published by Maruzen, Japan, pp. 826–827 (1982)]. In this connection, it should be noted that as mentioned before, the partially expanded portion is derived from the third layer and has the relatively thick unexpanded layer portion and the relatively thin expanded portion. The relatively thick unexpanded layer portion and the relatively thin expanded layer portion are formed as follows. Into the third layer, the leavening base and the leavening acid migrate from the first layer and the second layer, respectively, and the leavening acid and the leavening base react with each other. However, since the migration speed of the leavening base is extremely lower than that of the leavening acid, the leavening base having migrated from the first layer is contacted with the leavening acid having migrated from the second layer at a portion of the third layer adjacent the boundary between the first layer and the third layer, and the reaction between the leavening acid and the leavening base occurs at that portion adjacent the boundary between the first layer and the third layer to generate $CO_2$ gas. Therefore, the third layer is expanded at the portion adjacent the boundary between the first layer and the third layer. On the other hand, at the remaining portion of the third layer adjacent the second layer, since the leavening base does not migrate to the remaining portion, the reaction between the leavening base and the leavening acid does not occur. Therefore, the remaining portion adjacent the second layer remains unexpanded. Since, as mentioned above, the migration of the leavening base is extremely lower than that of the leavening acid, the reaction of the leavening base with the leavening acid occurs at the portion extremely adjacent the boundary between the first layer and the third layer. Therefore, the formed expanded layer portion is relatively thin as compared with the remaining portion, namely, the unexpanded density layer portion. That is, the unexpanded density layer portion is relatively thick. The relatively thin expanded layer portion constitute part of the expanded layer of the fresh dough of the present invention.

On the other hand, the unexpanded density layer contains a small amount of the employed leavening acid per se or, exceptionally, a small amount of gluconic acid in the case where glucono delta lactone is used as the leavening acid. Although the leavening acid in the second layer migrates to the first layer through the third layer, since the leavening base in the first layer, due to its low migration speed, does not migrate to the second layer and to the third layer at its large portion on the side of the second layer, the reaction of the leavening base with the leavening acid does not occur in the second layer and the large portion of the third layer. Therefore, the second layer and the large portion of the third layer are not expanded. As far as the unexpanded density layer is visually observed, it cannot be recognized that the unexpanded density layer has been derived from the second layer and the large portion of the third layer. However, as will be mentioned later, it can be recognized by the visual observation of the expanded layer that the expanded layer has been derived not only from the first layer but also a small portion of the third layer on the side of the first layer. Therefore, it can also be recognized that the unexpanded density layer has been derived from the second layer and the remaining large portion of the third layer.

The organic acid may generally be determined by means of customary chromatographies such as silica gel chromatography [see, for example, Shokuhin Bunsekiho (Methods of Food Analysis), edited by the Japanese Society for Food Science and Technology, published by Kohrin, Japan, chapter 11, p. 509- (1982)]. In the case where glucono delta lactone is used as the leavening acid, gluconic acid is detected as an organic acid. The gluconic acid may be determined by customary methods [see, for example, Bunseki Kagaku Binran (Handbook of Analytical Chemistry), edited by Japanese Society for Analytical Chemistry, published by Maruzen, Japan, p. 482 (1981); and Jikken Kagaku Koza (Lectures of Experimental Chemistry) Vol. 5, "Seibutsu Kagaku (Biological Chemistry) III", edited by the Japanese Chemical Society, published by Maruzen, Japan, p. 59]. Further, in the case where the second layer is of a gel, the unexpanded portion derived from the second layer is easily identified because the gel layer is distinctly formed in the unexpanded layer. The gel may be determined by the AOAC method described, for example, in Tennen Shokuhin Tenkabutsu (Natural Food Additives), published by the Nihon Eisei Gijutsu Kenkyukai (the Japanese Society for Hygienic Technology) chapter 5, section 6, p. 224.

As described before, the boundary between the expanded portions derived from the first layer and the relatively thin expanded layer portion of the partially expanded portion derived from the third layer is not distinct in the above-mentioned expanded layer. Also, the boundary between the unexpanded portion derived from the second layer and the relatively thick unexpanded layer portion of the partially expanded portion derived from the third layer is not distinct in the above-mentioned unexpanded layer. Therefore, the presence of the partially expanded portion derived from the third layer is not visually observed. However, the presence of the portions derived from the third layers can be recognized by the cell structure in the expanded layer as follows. That is, when the partially expanded portion derived from the third layer is present in the fresh dough, the whole cell structure of the expanded layer is fine. On the other hand, when the partially expanded portion derived from the third layer is not present in the fresh dough, the cell structure of the expanded layer at a portion adjacent the boundary between the expanded layer and the unexpanded density layer is coarse. Therefore, it can be recognized that the expanded layer consists of the expanded portion derived from the first layer and the relatively thin expanded layer portion derived from the third layer. In turn, it can also be recognized that the unexpanded density layer consists of the unexpanded portion derived from the second layer and the relatively thick unexpanded layer portion derived from the third layer.

The fresh dough of the present invention may further contain sugar, salt, edible oil and fat, a liquid flavor, a seasoning, etc.

The fresh dough of the present invention is contained in a container. As a container in which the fresh dough should be contained, there may be employed any of customary containers used for packing a conventional fresh dough. In a container, the fresh dough of the present invention is contained in a pressurized condition. Although the internal pressure of the container containing the fresh dough varies depending on the temperature, the internal pressure is generally about 0.2 to 1.0 kg/cm$^2$ (2° C.), preferably 0.2 to 0.7 kg/cm$^2$ (2° C.).

The above-mentioned fresh dough of the present invention is effectively, simply produced by a method developed by the present inventor. Therefore, according to the present invention, there is also provided a method for producing a fresh dough which comprises:

(a) providing a first material containing flour, water and a leavening base but containing no leavening acid, a second material containing a leavening acid but containing no leavening base, and a third material containing flour, water but containing neither leavening acid nor leavening base;

(b) piling up the first material, the second material and the third material such that said third material intervenes between said first material and said second material to obtain a piled material;

(c) sheeting said piled material, followed by lamination to form a laminated structure comprising first layers of said first material, second layers of said second material and third layers of said third material, said first, second and third layers constituting a laminated structure that the respective third layers intervene between the respective first layers and the respective second layers to prevent direct contact between said respective first layers and said respective second layers;

(d) cutting said laminated structure into dough pieces;

(e) packing the resulting dough pieces in a container for storage; and (f) allowing said leavening base and said leavening acid to react with each other until the reaction is completed.

In practicing the method of the present invention, a first material, a second material and a third material should first be prepared.

The first material is prepared, in the form of a dough, by blending flour, water and a leavening base. As a leavening base, there may be employed leavening bases as mentioned before. The amount of the leavening base to be used is in the range of 1 to 5% by weight, preferably 1.8 to 2.5% by weight based on the total amount of flour used for producing a fresh dough.

The second material may be prepared, in the form of a dough, by blending flour, water and a leavening acid. Alternatively, a leavening acid itself may be used as the second material. Further, the second material may also be prepared, in the form of a gel, by blending at least one hydrophilic polymer, water and a leavening acid. As a leavening acid, there may be employed leavening acids as mentioned before. The amount of the leavening acid to be used varies depending on the kind and the amount of a leavening base to be used, that is, the calculated amount of the leavening acid equivalent to the leavening base to be used is added. In the case where the second material is a gel, as the hydrophilic polymer, there may be employed hydrophilic polymers as mentioned before. The second material in the form of a gel may be prepared by blending at least one hydrophilic polymer, water and a leavening acid at a time. Alternatively, the second material in the form of a gel may be prepared by blending at least one hydrophilic polymer and water, followed by addition of a leavening acid while stirring. The amount of the hydrophilic polymer to be used is generally about 0.5 to 2% by weight based on the total amount of flour used for producing a fresh dough. The property of the gel is important. It is necessary for the gel to sufficiently extend when the gel is sheeted, followed by lamination by a customary method using a spreader such as roll sheeter or a Rheon stretcher. To attain the above-mentioned property, the weight ratio of the hydrophilic polymer to water is important. The suitable weight ratio varies depending on the kind of the hydrophilic polymer. For example, when carboxymethyl cellulose is used as a hydrophilic polymer, the weight ratio of the hydrophilic polymer to water is preferably 10/90 to 20/80. In order to improve the property of the gel, the second material may further contain a member selected from the group consisting of wheat gluten, microcrystalline cellulose, methyl cellulose, xanthane gum, sodium alginate, gelatin and konjak-mannan. Of them, wheat gluten and microcrystalline cellulose are most preferable.

The third material is prepared, in the form of a dough, by blending flour and water.

As the flour to be used in the present invention, there may be generally employed a wheat flour such as bread flour and cake flour. Further, as the flour, there may also be employed rice flour, soy bean flour and the like. The weight ratio of flour to water varies depending on the kinds and amounts of the other components added. Generally, the weight ratio of flour to water is 100/40 to 100/60.

To each of the first, second and third materials there may be further added sugar, table salt, edible oil and fat, a liquid flavoring (including alcohol), a seasoning, etc.

Then, the thus prepared first, second and third materials are piled up such that the third material intervenes between the first material and the second material to obtain a piled material. The weight ratios of the first material, the second material and the third material to the total of the first, second and third materials to be piled are 30 to 80%, 2 to 50% and 10 to 40%, respectively.

The piled material is sheeted, followed by lamination by a customary method using a spreader such as a roll sheeter, Rheon stretcher, etc. Further, the sheeting may also be effected by means of a customary extrusion technique. Thus, there is obtained a laminated structure comprising first layers of the first material, second layers of the second material and third layers of the third material. The first, second and third layers constitute a laminated structure that the respective third layers intervene between the respective first layers and the respective second layers to prevent direct contact between the respective first layers and the respective second layers. The thickness of a unit layer composed of one first layer, one second layer and one third layer of the laminated structure is about 0.01 to 1.0 mm, preferably about 0.05 to 0.5 mm in the case where the second material is of a dough. In the case where the second material is of a gel, the thickness of the unit layer is about 0.001 to 0.1 mm, preferably about 0.01 to 0.06 mm. It is undesirable that the thickness of the unit layer is too small, because the generation of $CO_2$ gas occurs quickly so that the shaping and packing of the resulting dough are difficult. On the other hand, it is undesirable that the thickness of the unit layer is too large, because the unexpanded layers of the resulting fresh dough becomes thick so that such a fresh dough gives a stiff bread. The above-mentioned lamination may be effected so that the laminated structure may comprise about 6 to 144 unit layers. The respective layers of the laminated structure may be partially broken.

The laminated structure thus obtained is cut into dough pieces having a predetermined shape.

In the dough pieces, 40 to 70% by weight of each of the leavening acid and leavening base remain unreacted. The weight % of the leavening acid and the leavening base remaining unreacted is determined as follows. A predetermined volume of the dough piece is put in a messcylinder and the reaction between the leavening acid and the leavening base is allowed to proceed until the rising of the dough piece is not observed any more. Then, the volume of the rised dough piece is measured, and the volume difference between the rised volume and the original volume of the dough piece is determined. The weight % (A) of the leavening acid and the leavening base remaining unreacted is calculated as follows:

$$A(\%) = C/B \times 100$$

wherein B is a theoretical volume of $CO_2$ gas which is generated by the reaction of the added chemical leaveners, and C is the volume difference as mentioned above.

The dough pieces are packed in a container for storage. The amount of the dough piece to be packed in a container are about 0.70 to 0.85 g/cc of the capacity of the container.

The container containing the dough piece is sealed and allowed to stand at about 5° to 35° C., preferably at 10° to 30° C., for about 1 to 4 hours, thereby to react the leavening acid and the leavening base with each other until the reaction is completed.

Thus, a fresh dough of the present invention is produced. The thus obtained fresh dough is suitable for producing a loaf.

On the other hand, after step (b) and before step (c) of the above-mentioned method, edible oil and fat may be applied to one of both the surfaces of the piled material and folding the resulting piled material so that the oil and fat is rolled in the piled material. As the edible oil and fat, there may be employed such as a margarine and a butter. In this case, there can be obtained a fresh dough for pastries such as croissant and danish.

The production of the fresh dough of the present invention may be carried out at temperature customarily employed for the production of conventional fresh doughs, desirably at low temperatures. When a fresh dough for pastries is produced, during or after the step of sheeting and laminating of the piled material, it is necessary to allow the material to stand still for several hours (retarding). The retarding of the material is effected preferably at 15° C. or less. The fresh dough of the present invention thus produced is stored in a refrigerator.

It should be noted that it is possible to blend a gel containing a hydrophilic polymer, water and a leavening acid with a dough containing flour, water and a leavening base to form a fresh dough.

In a further aspect of the present invention, there is provided a fresh dough contained in a container for storage and chemically leavened in the container, which comprises a vast plurality of gas cells and a matrix consisting of a mixture of flour and water and a gel dispersed in said mixture, said gel being one formed by the reaction between a hydrophilic polymer and a metal ion.

The fresh dough comprises a vast plurality of gas cells and a matrix consisting of a mixture of flour and water and a gel. The gas cells contain $CO_2$ gas generated by the reaction between a leavening acid and a leavening base and each other. The gel is dispersed in the mixture of flour and water uniformly. The gel is one formed by the reaction of a hydrophilic polymer with a metal ion.

As the hydrophilic polymer, there may be mentioned, for example, sodium alginate, carrageenan, sodium caseinate and low methoxyl pectin. The amount of the hydrophilic polymer is 0.5 to 2% by weight based on the weight of flour used for producing the fresh dough.

As the metal ion, there may be mentioned $Ca^{2+}$, $Mg^{2+}$ and $K^+$. The amount of the metal ion is 0.1 to 0.7 mg/g of a hydrophilic polymer used for producing the fresh dough.

As the flour, there may generally be employed a wheat flour such as bread flour and cake flour. Further, as the flour, there may also be employed rice flour, soy bean flour and the like.

The fresh dough may further contain sugar, table salt, edible oil and fat, liquid flavoring, seasoning, etc.

The above-mentioned fresh dough is prepared by a method for producing a fresh dough which comprises:

(a) providing a dough containing flour, water, a metal salt and a first chemical leavener selected from the group consisting of a leavening acid and a leavening base;

(b) blending with said dough a hydrophilic polymer and a second chemical leavener, provided that when said first chemical leavener is a leavening acid, said second chemical leavener is a leavening base, and that when said first chemical leavener is a leavening base, said second chemical leavener is a leavening acid;

(c) cutting the resulting blended dough into dough pieces;

(d) packing the resulting dough pieces in a container for storage;

(e) allowing said leavening base and said leavening acid to react with each other until the reaction is completed.

First, flour, water, a metal salt and a first chemical leavener are blended to form a dough. As the first chemical leavener, there may be employed one member selected from a group consisting of a leavening acid and a leavening base.

As the metal salt, there may be mentioned, for example, calcium chloride, potassium chloride, calcium lactate and calcium gluconate. The amount of the metal salt to be added is, as a metal ion, about 0.1 to 0.7 mg/g of a hydrophilic polymer which will be added later.

Then, the resulting dough is blended with a hydrophilic polymer and a second chemical leavener. With respect to the second chemical leavener, when the first chemical leavener is a leavening acid, the second chemical leavener should be a leavening base. Instead, when the first chemical leavener is a leavening base, the second chemical leavener should be a leavening acid.

As the hydrophilic polymer, there may be employed, for example, sodium alginate, carrageenan, sodium caseinate and low methoxyl pectin. The hydrophilic polymer and the second chemical leavener may be added at once to the dough. Alternatively, the hydrophilic polymer and the second chemical leavener may also be added separately to the dough. Further, the hydrophilic polymer and the second chemical leavener may be blended with water to form a hydrophilic polymer mixture, and added to the dough in the form of a hydrophilic polymer mixture.

The amounts of flour, water, chemical leaveners and hydrophilic polymer are the same as mentioned above.

The resulting blended dough is cut into dough pieces, followed by packing into a container for storage in substantially the same manner as mentioned before. The packed dough piece is allowed to stand under the conditions as mentioned above, thereby to react the leavening acid and the leavening base with each other until the reaction is completed. Thus, there is obtained the above-mentioned fresh dough of the present invention.

The fresh dough of the present invention has the following advantages.

In the case of a fresh dough comprising expanded portions derived from the first layers, unexpanded portions derived from the second layers and partially expanded portions derived from the third layers, when each the respective second layers consists of a leavening acid only or is of a dough containing flour, water and a leavening acid, the unexpanded layers derived from the second layers and the third layers serve to endure the pressure of the $CO_2$ gas generated so that the rupture of the fresh dough can be prevented. Further, the cells of $CO_2$ gas are fine. Therefore, when the fresh dough is baked, there can be obtained a bread having a soft and uniform texture, excellent taste and fine cell structure comparable to those of a yeast bread. On the other hand, when the respective second layer is of a gel, the gas-occluding ability is enhanced and, therefore, the bread made of such a fresh dough has excellent volume in addition to the above-mentioned excellent properties. Further, water migration in the fresh dough is restricted so that the fresh dough can be well prevented from becoming tacky.

The fresh dough as mentioned above can be produced by the method of the present invention in which the first material, the second material and the third material are piled up in the manner as mentioned before, followed by sheeting and lamination. The method of the present invention has the following advantages. That is, the generation of $CO_2$ gas can be effectively controlled by the action of the respective third layers because the reaction between a leavening acid and a leavening base is delayed until the leavening acid and the leavening base are caused to contact each other after migration of the leaveners. Therefore, the sufficient running time for producing a fresh dough can be ensured. Further, it is advantageous that the running time can be controlled by varing the thicknesses of the respective layers and the kinds of the chemical leaveners and the hydrophilic polymers because the time required for the initiation of the reaction between the leavening acid and the leavening base varies depending on the water solubilities of the leavening acid and the leavening base, the thicknesses of the respective layers, the diffusion velocities of the leavening acid and the leavening base in the respective layers, the water retention characteristics of the hydrophilic polymer, etc. Moreover, when the retarding of the laminated structure is effected for producing pastries such as croissant and danish, the generation of $CO_2$ gas can be effectively repressed due to the delayed reaction, so that the subsequent shaping and packing operation can be performed smoothly. Further, according to the present method, it is not necessary to make the thicknesses of the first, second and third layers so small as those of the shortening layer and flour/water matrix of the fresh dough disclosed in U.S. Pat. No. 4,381,315. Therefore, the time and labor can be saved in the steps of sheeting and laminating the piled material.

In the case of a fresh dough comprising gas cells and a matrix consisting of a mixture of flour and water and a gel dispersed in the mixture, the gel is dispersed uniformly in a matrix and serves to reinforce the cell walls of the gas cells. Therefore, the gas can be maintained surely in the fresh dough. Therefore, the fresh dough is not ruptured by the pressure of the generated $CO_2$ gas during the storage and is capable of maintaining the $CO_2$ gas therein during the storage. When such a dough is baked, there can be obtained a bread having an excellent volume, taste and texture comparable to those of a yeast bread. The fresh dough can be advantageously obtained by the method of the present invention which consists in blending a metal salt with flour and water to form a dough and subsequently blending the dough with a hydrophilic polymer to effect the reaction between the hydrophilic polymer and the metal ion so that gel is formed and dispersed uniformly in the matrix of the fresh dough.

The present invention will now be described in more detail with reference to the following Examples that should not be construed as limiting the scope of the invention.

EXAMPLE 1

(A Fresh Dough For Croissant)

According to the recipe as shown in Table 1, a first material containing a leavening base but containing no leavening acid, a second material containing a leavening acid but containing no leavening base and a third materials containing neither leavening acid nor leavening base were prepared. The weight ratios of the first material, the second material and the third materials to the total of the first, second and third material were 49.3%, 31.6% and 19.2%, respectively. In preparing each material, the mixing of components of each material was effected using a mixer (manufactured by Kanto Kongoki, Japan) at low speed for 3 min and subsequently at high speed for 4 min. Of the components, a margarine and a liquid flavoring were used for improving the taste of a product. As the margarine, there was used a margarine having a water content of 15% by weight and having good flavor of butter. As the liquid flavoring, Sakameto E (trade name of a liquid flavoring manufactured by Toyojozo Co., Ltd., Japan) having an alcohol content of 13% by weight was used.

The materials thus obtained were separately sheeted to form the respective sheets of the materials. The thus obtained sheets were carefully and precisely piled up so that the sheet of the third material intervened between the sheet of the first material and the sheet of the second material, thereby to form a piled material. Then, to the surface of the piled material on the side of the sheet of the second material, a margarine having a water content of about 15% by weight and having good flavor of butter was applied, and the resulting piled material was folded so that the margarine was rolled in the piled material. The resulting rolled material was sheeted and folded in three using a reverse sheeter (manufactured by Kamata Kikai, Japan). The thus folded material was further folded in two.

The thus folded material was allowed to stand at 2° C. for one hour in a retarder. During this step, the generation of a $CO_2$ gas in the folded material was very little.

Then, the folded material was further sheeted and folded in two, and the same sheeting and folding operation was conducted once more, thereby to obtain a laminated structure having a thickness of 4.0 mm. The thus obtained laminated structure was cut into dough pieces having a width of 150 mm, a length of 360 mm and a weight of 220 g.

One of the cut pieces was subjected to determination of the ratio of the leaveners remaining unreacted to the added leaveners by the method mentioned before. As a result, it was found that 52% by weight of the leaveners remained unreacted.

The respective dough pieces were rolled and packed in a container having a capacity of 290 ml and the container was sealed. After sealing, the dough piece in the container was allowed to stand at 20° C. for 2 hours so that the reaction of the leavening acid with the leavening base was substantially completed, thereby to obtain a fresh dough.

The fresh dough was stored in a refrigerator for 30 days. After storage, the fresh dough was taken out from the container. The taken-out fresh dough was firm in shape and non-tacky and had no rupture. Therefore, the fresh dough was easy to handle.

The fresh dough was cut into 4 pieces each weighing 55 g. Each piece was made to have a shape of croissant and was baked in an oven at 200° C. for 15 minutes to obtain a croissant. The thus obtained croissant was excellent in specific volume and assumed good color. Further, the croissant had uniform texture, and good lamination, and no brown coloration with unreacted leavening base in the interior of the croissant.

TABLE 1

| Components | Total (part by weight) | First material (part by weight) | Second material (part by weight) | Third material (part by weight) |
|---|---|---|---|---|
| Wheat flour (hard type preferred for bread) | 80 | 40 | 24 | 16 |
| Wheat flour (soft type preferred for cake) | 20 | 10 | 6 | 4 |
| Sugar | 6 | 3 | 1.8 | 1.2 |
| Salt | 1.5 | 0.75 | 0.45 | 0.3 |
| Nonfat dry milk | 3 | 1.5 | 0.9 | 0.6 |
| Margarine (to be mixed) | 5 | 2.5 | 1.5 | 1.0 |
| Liquid flavoring | 7 | 3.5 | 2.1 | 1.4 |
| Water | 57 | 28.5 | 17.0 | 11.5 |
| Sodium hydrogencarbonate | 2.5 | 2.5 | — | — |
| GDL (glucono delta lactone) | 5.3 | — | 5.3 | — |
| Margarine (to be rolled in) | 50 | — | — | — |
|  | 237.3 | 92.25 | 59.05 | 36.0 |

EXAMPLE 2

(A Fresh Dough For White Loaf)

According to the recipe as shown in Table 2, a first material containing a leavening base but containing no leavening acid, a second material consisting of a leavening acid only and a third material containing neither leavening acid nor leavening base were prepared. The weight ratios of the first material, the second material and the third material to the total of the first, second and third materials were 78.4%, 2.3% and 19.3%, respectively. In preparing the first and third materials, the mixing of components of each material was effected using a mixer (manufactured by Kanto Kongoki, Japan) at low speed for 3 min and subsequently at high speed for 4 min. Of the components, a margarine and a liquid flavoring were used for improving the taste of a product. As the margarine, there was used a margarine having a water content of 15% by weight and having good flavor of butter. As the liquid flavoring, Sakameto E (trade name of a liquid flavoring manufactured by Toyojozo Co., Ltd., Japan) having an alcohol content of 13% by weight was used.

The second material was wrapped in the third material and the obtained material was further wrapped in the first material. Then, the resulting material was sheeted and folded in three using a reverse sheeter (manufactured by Kamata Kikai, Japan). The thus obtained material was further sheeted and folded in three, and the same sheeting and folding operation was conducted once again, thereby to obtain a laminated structure having a thickness of 5.0 mm.

During this step, no generation of gas was observed and the surface of the dough showed good quality without any damage.

The thus obtained laminated structure was cut into dough pieces having a width 150 mm, a length of 300 mm and a weight of 220 g.

One of the cut pieces was subjected to determination of the ratio of the leaveners remaining unreacted to the added leaveners by the method mentioned before. Further, the time required for the fresh dough to expand to 125% of the original volume of the cut piece was measured. The result is shown in Table 5.

The respective dough pieces were rolled and packed in a container having a capacity of 300 ml and the container was sealed. After the sealing, the dough piece in the container was allowed to stand at 20° C. for 1 hour so that the reaction of the leavening acid with the leavening base was substantially completed, thereby to obtain a fresh dough.

The fresh dough was stored in a refrigerator for 10 days.

After storage, the fresh dough was taken out from the container. The taken-out fresh dough was firm in shape and non-tacky and had no rupture. Therefore, the fresh dough was easy to handle.

The fresh dough was baked in an oven at 200° C. for 15 min to obtain a white loaf. The thus obtained white loaf was excellent in specific volume and assumed good color. Further, the white loaf was soft with uniform internal texture, and had no brown coloration with unreacted leavening base in the interior of the white loaf.

TABLE 2

| Components | Total (part by weight) | First material (part by weight) | Second material (part by weight) | Third material (part by weight) |
|---|---|---|---|---|
| Wheat flour (hard type preferred for bread) | 100 | 80 | — | 20 |
| Sugar | 6 | 4.8 | — | 1.2 |
| Salt | 1.5 | 1.2 | — | 0.3 |
| Nonfat dry milk | 3 | 2.4 | — | 0.6 |
| Margarine (to be mixed) | 5 | 4 | — | 1.0 |
| Liquid flavoring | 7 | 5.6 | — | 1.4 |
| Water | 57 | 45.6 | — | 11.4 |
| Sodium hydrogencarbonate | 2 | 2 | — | — |
| GDL | 4.2 | — | 4.2 | — |
| | 185.7 | 145.6 | 4.2 | 35.9 |

COMPARATIVE EXAMPLE 1

(A Fresh Dough For White Loaf)

According to the recipe as shown in Table 3, a first material containing a leavening base but containing no leavening acid, a second material consisting of a leavening acid only were prepared. A material containing neither a leavening acid nor a leavening base was not prepared. The weight ratios of the first material and the second material to the total of the first and second materials were 97.7% and 2.3%, respectively. In preparing the first material, the mixing of components of the first material was effected using a mixer (manufactured by Kanto Kongoki, Japan) at low speed for 3 min and subsequently at high speed for 4 min. Of the components, a margarine and a liquid flavoring were used for improving the taste of a product. As the margarine, there was used a margarine having a water content of 15% by weight and having good flavor of butter. As the liquid flavoring, Sakameto E (trade name of liquid flavoring manufactured by Toyojozo Co., Ltd., Japan) having an alcohol content of 13% by weight was used.

The second material was directly wrapped in the first material. Then, the resulting material was sheeted and folded in three using a reverse sheeter (manufactured by Kamata Kikai, Japan). The thus folded material was further sheeted and folded in three, and the same sheeting and folding operation was conducted once again, thereby to obtain a laminated structure having a thickness of 5.0 mm.

The thus obtained laminated structure was cut into dough pieces having a width 150 mm, a length of 300 mm and a weight of 220 g.

One of the cut pieces was subjected to determination of the ratio of the leaveners remaining unreacted to the added leaveners by the method mentioned before. Further, the time required for the fresh dough to expand to 125% of the original volume of the cut piece was measured. The result is shown in Table 5.

The respective dough pieces were rolled and packed in a container having a capacity of 300 ml and the container was sealed. After the sealing, the dough piece in the container was allowed to stand at 20° C. for 1 hour so that the reaction of the leavening acid with the leavening base was substantially completed, thereby to obtain a fresh dough.

The fresh dough was stored in a refrigerator for 10 days.

After storage, the fresh dough was taken out from the container. The taken-out fresh dough showed poor quality with ruptures formed because of the gas generated in the folding step. Further, at the time of packing the dough pieces in a container, the ratio of the leavening acid and leavening base remaining unreacted to the added leaveners was so low that it was difficult to pack the dough pieces in a container.

TABLE 3

| Components | Total (part by weight) | First material (part by weight) | Second material (part by weight) |
|---|---|---|---|
| Wheat flour (hard type preferred for bread) | 100 | 100 | — |
| Sugar | 6 | 6 | — |
| Salt | 1.5 | 1.5 | — |
| Nonfat dry milk | 3 | 3 | — |
| Margarine (to be mixed) | 5 | 5 | — |
| Liquid flavoring | 7 | 7 | — |
| Water | 57 | 57 | — |
| Sodium hydrogencarbonate | 2 | 2 | — |
| GDL | 4.2 | — | 4.2 |
| | 185.7 | 181.5 | 4.2 |

COMPARATIVE EXAMPLE 2

(A Fresh Dough For White Loaf)

According to the recipe as shown in Table 4, a first material containing a leavening base but containing no leavening acid, a second material containing a leavening acid but containing no leavening base were prepared. The weight ratios of the first material and the second material to the total of the first and second materials were 59.0% and 41.0%, respectively. In preparing each material, the mixing of components of each material was effected using a mixer (manufactured by Kanto Kongoki, Japan) at low speed for 3 minutes and subsequently at high speed for 4 minutes. Of the components, a margarine and a liquid flavoring were used for improving the taste of a product.

The second material was wrapped in the first material. Then, the resulting material was sheeted and folded in three using a reverse sheeter (manufactured by Kamata Kikai, Japan). The thus folded material was further sheeted and folded in three, and the same sheeting and folding operation was conducted once again, thereby to obtain a laminated structure having a thickness of 5.0 mm.

The thus obtained laminated structure was cut into dough pieces having a width 150 mm, a length of 300 mm and a weight of 220 g.

One of the cut pieces was subjected to determination of the ratio of the leaveners remaining unreacted to the added leaveners by the method mentioned before. Further, the time required for the fresh dough to expand to 125% of the original volume of the cut piece was measured. The result is shown in Table 5.

The respective dough pieces were packed in a container having a capacity of 300 ml and the container was sealed. After the sealing, the dough piece in the container was allowed to stand at 20° C. for 1 hour so that the reaction of the leavening acid with the leavening base was substantially completed, thereby to obtain a fresh dough.

The fresh dough was stored in a refrigerator for 10 days.

After storage, the fresh dough was taken out of the container and baked in an oven at 200° C. for 15 minutes.

The cell wall in the interior of the thus baked bread was thick and hard.

TABLE 4

| Components | Total (part by weight) | First material (part by weight) | Second material (part by weight) |
|---|---|---|---|
| Wheat flour (hard type preferred for bread) | 100 | 60 | 40 |
| Sugar | 6 | 3.6 | 2.4 |
| Salt | 1.5 | 0.9 | 0.6 |
| Nonfat dry milk | 3 | 1.8 | 1.2 |
| Margarine (to be mixed) | 5 | 3.0 | 2.0 |
| Liquid flavoring | 7 | 4.2 | 2.8 |
| Water | 57 | 34.2 | 22.8 |
| Sodium hydrogencarbonate | 2 | 2.0 | — |
| GDL | 4.2 | — | 4.2 |
|  | 185.7 | 109.7 | 76.0 |

TABLE 5

|  | Example 2 | Comparative Example 1 | Comparative Example 2 |
|---|---|---|---|
| ratio of unreacted leaveners (%) | 63 | 42 | 52 |
| time (min) | 12 | 2 | 5 |

EXAMPLE 3

(A Fresh Dough For White Loaf)

According to the recipe as shown in Table 6, a first material containing a leavening base but containing no leavening acid, a second material containing a leavening acid but containing no leavening base and a third material containing neither a leavening acid nor a leavening base were prepared. The weight ratios of the first material, the second material and the third material to the total of the first, second and third materials were 65.1%, 7.7% and 27.2%, respectively. In preparing the first and third materials, the mixing of components of each material was effected using a mixer (manufactured by Kanto Kongoki, Japan) at low speed for 3 minutes and subsequently a high speed for 4 minutes. The second material was prepared by dispersing a leavening acid in a hydrophilic polymer gel consisting of carboxymethyl cellulose and water. Of the components, a margarine and a liquid flavoring were used for improving the taste of a product. As the margarine, there was used a margarine having a water content of 15% by weight and having good flavor of butter. As the liquid flavoring, Sakameto E (trade name of a liquid flavoring manufactured by Toyojozo Co., Ltd., Japan) having an alcohol content of 13% by weight was used.

The second material was wrapped in the third material. The obtained material was further wrapped in the first material. The resulting material was sheeted and folded in three using a reverse sheeter (manufactured by Kamata Kikai, Japan). The thus folded material was further sheeted and folded in three, and the same sheeting and folding operation was conducted once again, thereby to obtain a laminated structure having a thickness of 5.0 mm.

During this step, no generation of gas was observed and the surface of the dough showed good quality without any damage.

The thus obtained dough was cut into dough pieces having a width of 150 mm, a length of 300 mm and a weight of 220 g.

One of the cut pieces was subjected to determination of the ratio of the leaveners remaining unreacted to the added leaveners by the method mentioned before. Further, the time required for the fresh dough to expand to 125% of the original volume of the cut piece was measured. The result is shown in Table 8.

The respective dough pieces were rolled and packed in a container having a capacity of 300 ml and the container was sealed. After the sealing, the dough piece in the container was allowed to stand at 20° C. for 1 hour so that the reaction of the leavening acid with the leavening base was substantially completed, thereby to obtain a fresh dough.

The fresh dough was stored in a refrigerator for 10 days.

After storage, the fresh dough was taken out from the container. The taken-out fresh dough was firm in shape and non-tacky, and had no rupture. Therefore, the fresh dough was easy to handle.

The fresh dough was baked in an oven at 200° C. for 15 minutes to obtain a white loaf. The thus obtained white loaf was excellent in specific volume and assumed good color. Further, the white loaf was soft with uniform internal texture, and had no brown coloration with unreacted leavening base in the interior of the white loaf.

TABLE 6

| Components | Total (part by weight) | First material (part by weight) | Second material (part by weight) | Third material (part by weight) |
|---|---|---|---|---|
| Wheat flour (hard type preferred for bread) | 80 | 56 | — | 24 |
| Wheat flour (soft type preferred for cake) | 20 | 14 | — | 6 |
| Sugar | 6 | 4.2 | — | 1.8 |
| Salt | 1.5 | 1.05 | — | 0.45 |
| Nonfat dry milk | 3 | 2.1 | — | 0.9 |
| Margarine (to be mixed) | 5 | 3.5 | — | 1.5 |
| Liquid flavoring | 7 | 4.9 | — | 2.1 |
| Water | 68 | 41 | 10 | 17 |
| Sodium hydrogencarbonate | 2 | 2 | — | — |
| GDL | 4.2 | — | 4.2 | — |
| Carboxy methylcellulose | 1 | — | 1 | — |
| | 197.7 | 128.75 | 15.2 | 53.75 |

COMPARATIVE EXAMPLE 3

(A Fresh Dough For White Loaf)

According to the recipe as shown in Table 7, a first material containing a leavening base but containing no leavening acid, a second material consisting of a leavening acid only were prepared. A material containing neither leavening acid nor leavening base was not prepared. The weight ratios of the first material and the second material to the total of the first and second materials were 92.3% and 7.7%, respectively. In preparing the first material, the mixing of components of the material was effected using a mixer (manufactured by Kanto Kongoki, Japan) at low speed for 3 min and subsequently at high speed for 4 min. Of the components, a margarine and a liquid flavoring were used for improving the taste of a product. As the margarine, there was used a margarine having a water content of 15% by weight and having good flavor of butter. As the liquid flavoring, Sakameto E (trade name of a liquid flavoring manufactured by Toyojozo Co., Ltd., Japan) having an alcohol content of 13% by weight was used.

The second material was directly wrapped in the first material. The resulting material was sheeted and folded in three using a reverse sheeter (manufactured by Kamata Kikai, Japan). The thus folded material was further sheeted and folded in three and the same operation was conducted once more, thereby to obtain a laminated structure having a thickness of 5.0 mm.

The thus obtained laminated structure was cut into dough pieces having a width of 150 mm, a length of 300 mm and a weight of 220 g.

One of the cut pieces was subjected to determination of the ratio of the leaveners remaining unreacted to the added leaveners by the method mentioned before. Further, the time required for the fresh dough to expand to 125% of the original volume of the cut piece was measured. The result is shown in Table 8.

The respective dough pieces were rolled and packed in a container having a capacity of 300 ml and the container was sealed. After the sealing, the dough piece in the container was allowed to stand at 20° C. for 1 hour so that the reaction of the leavening acid with the leavening base was substantially completed, thereby to obtain a fresh dough.

The fresh dough was stored in a refrigerator for 10 days.

After storage, the fresh dough was taken out from the container. The taken-out fresh dough showed poor quality with ruptures formed because of the gas generated in the folding step. Further, at the time of packing the dough pieces in a container, the ratio of the leavening acid and leavening base remaining unreacted to the added leaveners was so low that it was difficult to pack the dough pieces in a container.

TABLE 7

| Components | Total (part by weight) | First material (part by weight) | Second material (part by weight) |
|---|---|---|---|
| Wheat flour (hard type preferred for bread) | 80 | 80 | — |
| Wheat flour (soft type preferred for cake) | 20 | 20 | — |
| Sugar | 6 | 6 | — |
| Salt | 1.5 | 1.5 | — |
| Nonfat dry milk | 3 | 3 | — |
| Margarine (to be mixed) | 5 | 5 | — |
| Liquid flavoring | 7 | 7 | — |
| Water | 68 | 58 | 10 |
| Sodium hydrogencarbonate | 2 | 2 | — |
| GDL | 4.2 | — | 4.2 |
| Carboxymethyl cellulose | 1 | — | 1 |
| | 197.7 | 182.5 | 15.2 |

TABLE 8

| | Example 3 | Comparative Example 3 |
|---|---|---|
| ratio of unreacted leaveners (%) | 72 | 42 |
| time (min) | 15 | 5 |

EXAMPLE 4

(A Fresh Dough For Butter Roll)

According to the recipe as shown in Table 9, a first material containing a leavening base but containing no leavening acid, a second material containing a leavening acid but containing no leavening base and a third material containing neither leavening acid nor leavening base were prepared. In preparing the first and third materials, the mixing of components of each material was effected using a mixer (manufactured by Kanto Kongoki, Japan) at low speed for 3 minutes and subsequently at high speed for 4 minutes. The second material was prepared by mixing glucono delta lactone as the leavening acid, carboxymethyl cellulose as a hydrophilic polymer, wheat gluten and water.

The second material was wrapped in the third material and the obtained material was further wrapped in the first material. The resulting material was sheeted and folded in three using a reverse sheeter (manufactured by Kamata Kikai, Japan). The thus folded material was further sheeted and folded in three, and the same sheeting and folding operation was conducted two more times.

In this folding step, the gel was stretched well and was uniformly dispersed, and the dough was not damaged. The temperature of the dough and the gel was kept at 15° C.

The folded material was stretched, thereby to obtain a laminated structure having a thickness of 5.0 mm. The thus obtained laminated structure was cut into dough pieces having a width of 150 mm, a length of 300 mm and a weight of 220 g.

One of the cut pieces was subjected to determination of the ratio of the leaveners remaining unreacted to the added leaveners by the method mentioned before. As a result, it was found that 67% by weight of the leaveners remained unreacted.

The respective dough pieces were rolled and each dough piece was further cut into five pieces, each weighing 44 g. The obtained dough pieces were packed in a container having a capacity of 300 ml. After the packing, the dough piece in the container was allowed to stand at 20° C. for 1 hour so that the reaction of the leavening acid with the leavening base was substantially completed, thereby to obtain a fresh dough.

The fresh dough was stored in a refrigerator for 30 days.

After storage, the fresh dough was taken out from the container. The taken-out fresh dough was firm in shape and non-tacky, and had no rupture. Therefore, the fresh dough was easy to handle.

The fresh dough was baked in an oven at 200° C. for 12 minutes to obtain a butter roll. The thus obtained butter roll was excellent in specific volume and assumed good color. Further, the butter roll was soft with having uniform internal texture, and had no brown coloration with unreacted leavening base in the interior of the butter roll.

TABLE 9

| Components | Total (part by weight) | First material (part by weight) | Second material (part by weight) | Third material (part by weight) |
|---|---|---|---|---|
| Wheat flour (hard type preferred for bread) | 100 | 70 | — | 30 |
| Sugar | 6 | 4.2 | — | 1.8 |
| Salt | 1.5 | 1.05 | — | 0.45 |
| Nonfat dry milk | 3 | 2.1 | — | 0.9 |
| Margarine (to be mixed) | 15 | 10.5 | — | 4.5 |
| Liquid flavoring | 10 | 7 | — | 3 |
| Water | 64 | 30.8 | 20 | 13.2 |
| Sodium hydrogencarbonate | 2 | 2 | — | — |
| GDL | 4.2 | — | 4.2 | — |
| Carboxymethyl cellulose | 2 | — | 2 | — |
| Wheat gluten | 1.2 | — | 1.2 | — |
|  | 208.9 | 127.65 | 27.4 | 53.85 |
| ratio (%) | 100 | 61.1 | 13.1 | 25.8 |

EXAMPLE 5

(A Fresh Dough For White Loaf)

According to the recipe as shown in Table 10, a first material and a third material were prepared in substantially the same manner as in Example 4. The second material was prepared by mixing locust bean gum as a hydrophilic polymer, microcrystalline cellulose and water to form a gel and then dispersing glucono delta lactone as a leavening acid in the obtained gel.

The second material was wrapped in the third material and the obtained material was further wrapped in the first material. The resulting material was sheeted and folded using Rheon Stretcher so that the thus folded material had 16 unit layers each composed of a first layer of the first material, a second layer of the second material and a third layer of the third material.

In this folding step, the gel was stretched well, and the dough was not damaged. The temperature of the dough and the gel was kept at 15° C.

The folded material was sheeted, thereby to obtain a laminated structure having a thickness of 5.0 mm. The thus obtained laminated structure was cut into dough pieces having a width of 1 50 mm, a length of 300 mm and a weight of 220 g.

One of the cut pieces was subjected to determination of the ratio of the leaveners remaining unreacted to the added leaveners by the method mentioned before. As a result, it was found that 57% by weight of the leaveners remained unreacted.

The respective dough pieces were rolled and packed in a container having a capacity of 300 ml. After the packing, the dough piece in the container was allowed to stand at 20° C. for 1 hour so that the reaction of the leavening acid with the leavening base was completed, thereby to obtain a fresh dough.

The fresh dough was stored in a refrigerator for 30 days.

After storage, the fresh dough was taken out from the container. The taken-out fresh dough was firm in shape and non-tacky, and had no rupture. Therefore, the fresh dough was easy to handle.

The fresh dough was baked in an oven at 200° C. for 20 minutes to obtain a white loaf. The thus obtained white loaf was excellent in specific volume and assumed good color. Further, the white loaf was soft with uniform internal texture, and had no brown coloration with unreacted leavening base in the interior of the white loaf.

TABLE 10

| Components | Total (part by weight) | First material (part by weight) | Second material (part by weight) | Third material (part by weight) |
|---|---|---|---|---|
| Wheat flour (hard type preferred for bread) | 100 | 70 | — | 30 |
| Sugar | 6 | 4.2 | — | 1.8 |
| Salt | 1.5 | 1.05 | — | 0.45 |
| Nonfat dry milk | 3 | 2.1 | — | 0.9 |
| Margarine (to be mixed) | 15 | 10.5 | — | 4.5 |
| Liquid flavoring | 10 | 7 | — | 3 |
| Water | 56 | 32.9 | 9 | 14.1 |
| Sodium hydrogencarbonate | 2 | 2 | — | — |
| GDL | 4.2 | — | 4.2 | — |
| Locust bean gum | 1 | — | 1 | — |

TABLE 10-continued

| Components | Total (part by weight) | First material (part by weight) | Second material (part by weight) | Third material (part by weight) |
| --- | --- | --- | --- | --- |
| Microcrystalline cellulose | 1 | — | 1 | — |
|  | 199.7 | 129.75 | 15.2 | 54.75 |
| ratio (%) | 100 | 65.0 | 7.6 | 27.4 |

EXAMPLE 6

(A Fresh Dough For White Loaf)

According to the recipe as shown in Table 11, a first material and a third material were prepared in the same manner as in Example 4. The second material was prepared as follows. First, tamarind gum was added to water. The resulting mixture was heated to 80° C. so that the tamarind gum was completely dissolved in water. Then, the mixture was cooled to 10° C., thereby to obtain a gel. To the gel was added glucono delta lactone, followed by mixing. Thus, there was obtained the second material in the form of a gel.

The second material was wrapped in the third material and the obtained material was further wrapped in the first material. The resulting material was sheeted and folded in three using a reverse sheeter (manufactured by Kamata Kikai, Japan), and the same sheeting and folding operation was conducted two more times.

In this folding step, the gel was stretched well, and the dough was not damaged. The temperature of the dough and the gel was kept at 15° C.

The folded material was stretched, thereby to obtain a laminated structure having a thickness of 5.0 mm. The thus obtained laminated structure was cut into dough pieces having a width of 150 mm, a length of 300 mm and a weight of 220 g.

One of the cut pieces was subjected to determination of the ratio of the leaveners remaining unreacted to the added leaveners by the method mentioned before. As a result, it was found that 61% by weight of the leaveners remained unreacted.

The respective dough pieces were rolled and packed in a container having a capacity of 300 ml. After the packing, the dough piece in the container was allowed to stand at 20° C. for 1 hour so that the reaction of the leavening acid with the leavening base was substantially completed, thereby to obtain a fresh dough.

The fresh dough was stored in a refrigerator for 30 days.

After storage, the fresh dough was taken out from the container. The taken-out fresh dough was firm in shape and non-tacky, and had no rupture. Therefore, the fresh dough was easy to handle.

The fresh dough was baked in an oven at 200° C. for 20 minutes to obtain a white loaf. The thus obtained white loaf was excellent in specific volume and assumed good color. Further, the white loaf was soft with uniform internal texture, and had no brown coloration with unreacted leavening base in the interior of the white loaf.

TABLE 11

| Components | Total (part by weight) | First material (part by weight) | Second material (part by weight) | Third material (part by weight) |
| --- | --- | --- | --- | --- |
| Wheat flour (hard type preferred for bread) | 100 | 70 | — | 30 |
| Sugar | 6 | 4.2 | — | 1.8 |
| Salt | 1.5 | 1.05 | — | 0.45 |
| Nonfat dry milk | 3 | 2.1 | — | 0.9 |
| Margarine (to be mixed) | 10 | 7 | — | 3 |
| Liquid flavoring | 10 | 7 | — | 3 |
| Water | 57 | 32.9 | 10 | 14.1 |
| Sodium hydrogencarbonate | 2 | 2 | — | — |
| GDL | 4.2 | — | 4.2 | — |
| Tamarind gum | 1 | — | 1 | — |
|  | 194.7 | 126.25 | 15.2 | 53.25 |
| ratio (%) | 100 | 64.8 | 7.8 | 27.3 |

EXAMPLE 7

(A Fresh Dough For White Loaf)

According to the recipe as shown in Table 12 a first material and a third material were prepared in the same manner as in Example 4. The second material was prepared by mixing tragacanth gum as a hydrophilic polymer and water to form a gel and dispersing glucono delta lactone as a leavening acid in the obtained gel.

The second material was wrapped in the third material and the obtained material was further wrapped in the first material. The resulting material was sheeted and folded using Rheon Stretcher so that the thus folded material has 16 unit layers each composed of a first layer of the first material, a second layer of the second material and a third layer of the third material.

In this folding step, the gel was stretched well, and the dough was not damaged. The temperature of the dough and the gel was kept at 15° C.

The folded material was sheeted, thereby to obtain a laminated structure having a thickness of 5.0 mm. The thus obtained laminated structure was cut into dough pieces having a width of 150 mm, a length of 300 mm and a weight of 220 g.

One of the cut pieces was subjected to determination of the ratio of the leaveners remaining unreacted to the added leaveners by the method mentioned before. As a result 54% by weight of the leaveners remained unreacted.

The respective dough pieces were rolled and packed in a container having a capacity of 300 ml. After the packing, the dough piece in the container was allowed to stand at 20° C. for 1 hour so that the reaction of the leavening acid with the leavening base was substantially completed, thereby to obtain a fresh dough.

The fresh dough was stored in a refrigerator for 30 days.

After storage, the fresh dough was taken out from the container. The taken-out fresh dough was firm in shape and non-tacky and had no rupture. Therefore, the fresh dough was easy to handle.

The fresh dough was baked in an oven at 200° C. for 20 minutes to obtain a white loaf. The thus obtained white loaf was excellent in specific volume and assumed good color. Further, the white loaf was soft with uniform internal texture, and had no brown coloration with unreacted leavening base in the interior of the white loaf.

TABLE 12

| Components | Total (part by weight) | First material (part by weight) | Second material (part by weight) | Third material (part by weight) |
|---|---|---|---|---|
| Wheat flour (hard type preferred for bread) | 100 | 70 | — | 30 |
| Sugar | 6 | 4.2 | — | 1.8 |
| Salt | 1.5 | 1.05 | — | 0.45 |
| Nonfat dry milk | 3 | 2.1 | — | 0.9 |
| Margarine (to be mixed) | 15 | 10.5 | — | 4.5 |
| Liquid flavoring | 10 | 7 | — | 3 |
| Water | 57 | 32.9 | 10 | 14.1 |
| Sodium hydrogencarbonate | 2 | 2 | — | — |
| GDL | 4.2 | — | 4.2 | — |
| Trogacanth gum | 1.5 | — | 1.5 | — |
| | 200.2 | 129.75 | 15.7 | 54.75 |
| ratio (%) | 100 | 64.8 | 7.8 | 27.3 |

EXAMPLE 8

(A Fresh Dough For White Loaf)

According to the recipe as shown in Table 13, a first material and a third material were prepared in the same manner as in Example 4. The second material was prepared by mixing carrageenan as a hydrophilic polymer and water to form a gel and then dispersing glucono delta lactone as a leavening acid in the obtained gel.

The second material was wrapped in the third material and the obtained material was further wrapped in the first material. The resulting material was sheeted and folded using Rheon Stretcher so that the thus folded material had 16 unit layers each composed of a first layer of the first material, a second layer of the second material and a third layer of the third material.

In this folding step, the gel was stretched well and was uniformly dispersed, and the dough was not damaged. The temperature of the dough and the gel was kept at 15° C.

The folded material was stretched, thereby to obtain a laminated structure having a thickness of 5.0 mm. The thus obtained laminated structure was cut into dough pieces having a width of 150 mm, a length of 300 mm and a weight of 220 g.

One of the cut pieces was subjected to determination of the ratio of the leaveners remaining unreacted to the added leaveners by the method mentioned before. As a result, it was found that 50% by weight of the leaveners remained unreacted.

The respective dough pieces were rolled and packed in a container having a capacity of 300 ml. After the packing, the dough piece in the container was allowed to stand at 20° C. for 1 hour so that the reaction of the leavening acid with the leavening base was substantially completed, thereby to obtain a fresh dough.

The fresh dough was stored in a refrigerator for 30 days.

After storage, the fresh dough was taken out from the container. The taken-out fresh dough was firm in shape and non-tacky, and had no rupture. Therefore, the fresh dough was easy to handle.

The fresh dough was baked in an oven at 200° C. for 20 minutes to obtain a white loaf. The thus obtained white loaf was excellent in specific volume and assumed good color. Further, the white loaf was soft with uniform internal texture, and had no brown coloration with unreacted leavening base in the interior of the white loaf.

TABLE 13

| Components | Total (part by weight) | First material (part by weight) | Second material (part by weight) | Third material (part by weight) |
|---|---|---|---|---|
| Wheat flour (hard type preferred for bread) | 100 | 70 | — | 30 |
| Sugar | 6 | 4.2 | — | 1.8 |
| Salt | 1.5 | 1.05 | — | 0.45 |
| Nonfat dry milk | 3 | 2.1 | — | 0.9 |
| Margarine (to be mixed) | 15 | 10.5 | — | 4.5 |
| Liquid flavoring | 10 | 7 | — | 3 |
| Water | 57 | 32.9 | 10 | 14.1 |
| Sodium hydrogencarbonate | 2 | 2 | — | — |
| GDL | 4.2 | — | 4.2 | — |
| Carrageenan | 1 | — | 1 | — |
| | 199.7 | 129.75 | 15.2 | 54.75 |
| ratio (%) | 100 | 65.0 | 7.6 | 27.4 |

EXAMPLE 9

(A Fresh Dough For Bread)

According to the recipe as shown in Tables 14 and 15, a dough matrix and a hydrophilic polymer mixture were prepared respectively. Wheat, sugar, table salt, sodium hydrogencarbonate as a leavening base and calcium gluconate, water, liquid flavoring and margarine were mixed using a mixer (manufactured by Kano Kongoki, Japan) at low speed for 3 min and subsequently at high speed for 6 min to obtain a dough matrix. On the other hand, glucono delta lactone as a leavening acid, sodium alginate and water were mixed to obtain a hydrophilic polymer mixture. The obtained hydrophilic polymer mixture was added to the obtained dough matrix, followed by mixing using the above-mentioned mixer at low speed for 3 minutes and at high speed for 3 minutes.

The mixed material was cut into dough pieces, each weighing 50 g. The respective dough pieces were rolled into balls. Five of them were packed in a container having a capacity of 300 ml and the container was sealed. After the sealing, the dough piece in the container was allowed to stand at 20° C. for 1 hour so that the reaction of the leavening acid with the leavening base was substantially completed, thereby to obtain a fresh dough.

After the rising of the dough piece, gelation of the hydrophilic polymer occurred gradually, thereby to enhance the gas-occluding ability of the fresh dough.

The fresh dough was stored in a refrigerator for 30 days.

After storage, the fresh dough was taken out from the container. The taken-out fresh dough was firm in shape and non-tacky and had no rupture. Therefore, the fresh dough was easy to handle. No $CO_2$ gas leakage was observed in the container and the $CO_2$ gas was maintained inside the fresh dough.

The fresh dough was baked in an oven at 200° C. for 12 minutes to obtain a bread. The thus obtained bread was excellent in specific volume and assumed good color. Further, the bread was soft with uniform internal texture.

TABLE 14

| Dough matrix | |
|---|---|
| Components | Amount (part by weight) |
| Wheat flour (hard type preferred for bread) | 100 |
| Sugar | 6 |
| Salt | 1.5 |
| Nonfat dry milk | 3 |
| Margarine (to be mixed) | 10 |
| Liquid flavoring | 10 |
| Water | 47 |
| Sodium hydrogencarbonate | 2 |
| Calcium gluconate | 2.8 |

TABLE 15

| Hydrophilic polymer mixture | |
|---|---|
| Components | Amount (part by weight) |
| Sodium alginate | 1 |
| Glucono delta lactone | 4.2 |
| Water | 15 |

EXAMPLE 10

(A Fresh Dough For Bread)

According to the recipe as shown in Tables 16 and 17, a dough matrix and a hydrophilic polymer mixture were prepared in substantially the same manner as in Example 9 except that calcium chloride was used in place of calcium gluconate and sodium caseinate was used in place of sodium alginate.

Using the thus obtained dough matrix and hydrophilic polymer mixture, a fresh dough was prepared in substantially the same manner as in Example 9.

After the rising of the dough piece, gelation of the hydrophilic polymer occurred gradually, thereby to enhance the gas-occluding ability of the fresh dough.

The obtained fresh dough was stored in a refrigerator for 30 days.

After storage, the fresh dough was taken out from the container. The taken-out fresh dough was firm in shape and non-tacky, and had no rupture. Therefore, the fresh dough was easy to handle. No $CO_2$ gas leakage was observed in the container and the $CO_2$ gas was maintained inside the fresh dough.

The fresh dough was baked in an oven at 200° C. for 12 minutes to obtain a loaf of bread. The thus obtained bread was excellent in specific volume and assumed good color. Further, the bread was soft with uniform internal texture.

TABLE 16

| Dough matrix | |
|---|---|
| Components | Amount (part by weight) |
| Wheat flour (hard type preferred for bread) | 100 |
| Sugar | 6 |
| Salt | 1.5 |
| Nonfat dry milk | 3 |
| Margarine (to be mixed) | 10 |
| Liquid flavoring | 10 |
| Water | 47 |
| Sodium hydrogencarbonate | 2 |

TABLE 16-continued

| Dough matrix | |
|---|---|
| Components | Amount (part by weight) |
| Calcium chloride | 3 |

TABLE 17

| Hydrophilic polymer mixture | |
|---|---|
| Components | Amount (part by weight) |
| Sodium caseinate | 2 |
| Glucono delta lactone | 4.2 |
| Water | 20 |

EXAMPLE 11

(A Fresh Dough For Bread)

According to the recipe as shown in Tables 18 and 19, a dough matrix and a hydrophilic polymer mixture were prepared in substantially the same manner as in Example 9 except that potassium carbonate was used in place of calcium gluconate and carrageenan was used in place of sodium alginate.

Using the thus obtained dough matrix and hydrophilic polymer mixture, a fresh dough was prepared in substantially the same manner as in Example 9.

After the rising of the dough piece, gelation of the hydrophilic polymer occurred gradually, thereby to enhance the gas-occluding ability of the fresh dough.

The obtained fresh dough was stored in a refrigerator for 30 days.

After storage, the fresh dough was taken out from the container. The taken-out fresh dough was firm in shape and non-tacky, and had no rupture. Therefore, the fresh dough was easy to handle. No $CO_2$ gas leackage was observed in the container and the $CO_2$ gas was maintained inside the fresh dough.

The fresh dough was baked in an oven at 200° C. for 12 minutes to obtain a bread. The thus obtained bread was excellent in specific volume and assumed good color. Further, the bread was soft with uniform internal texture.

TABLE 18

| Dough matrix | |
|---|---|
| Components | Amount (part by weight) |
| Wheat flour (hard type preferred for bread) | 100 |
| Sugar | 6 |
| Salt | 1.5 |
| Nonfat dry milk | 3 |
| Margarine (to be mixed) | 10 |
| Liquid flavoring | 10 |
| Water | 47 |
| Sodium hydrogencarbonate | 2 |
| Potassium carbonate | 1 |

TABLE 19

| Hydrophilic polymer mixture | |
|---|---|
| Components | Amount (part by weight) |
| Carrageenan | 0.5 |
| Glucono delta lactone | 4.2 |
| Water | 15 |

EXAMPLE 12

(A Fresh Dough For Bread)

According to the recipe as shown in Tables 20 and 21, a dough matrix and a hydrophilic polymer mixture were prepared in substantially the same manner as in Example 9 except that calcium lactate was used in place of calcium gluconate and low methoxyl pectin was used in place of sodium alginate.

Using the thus obtained dough matrix and hydrophilic polymer mixture, a fresh dough was prepared in substantially the same manner as in Example 9.

After the rising of the dough piece, gelation of the hydrophilic polymer occurred gradually, thereby to enhance the gas-occluding ability of the fresh dough.

The obtained fresh dough was stored in a refrigerator for 30 days.

After storage, the fresh dough was taken out from the container. The taken-out fresh dough was firm in shape and non-tacky, and had no rupture. Therefore, the fresh dough was easy to handle. No $CO_2$ gas leakage was observed in the container and the $CO_2$ gas was maintained inside the fresh dough.

The fresh dough was baked in an oven at 200° C. for 12 minutes to obtain a bread. The thus obtained bread was excellent in specific volume and assumed good color. Further, the bread was soft with uniform internal texture.

TABLE 20

| Dough matrix | |
|---|---|
| Components | Amount (part by weight) |
| Wheat flour (hard type preferred for bread) | 100 |
| Sugar | 6 |
| Salt | 1.5 |
| Nonfat dry milk | 3 |
| Margarine (to be mixed) | 10 |
| Liquid flavoring | 10 |
| Water | 47 |
| Sodium hydrogencarbonate | 2 |
| Calcium lactate | 3 |

TABLE 21

| Hydrophilic polymer mixture | |
|---|---|
| Components | Components (part by weight) |
| Low methoxyl pectin | 2 |
| Glucono delta lactone | 4.2 |
| Water | 15 |

What is claimed is:

1. A fresh dough contained in a container for storage and chemically leavened in the container, which comprises:
   (1) expanded dough portions which are derived from a first plurality of layers each containing flour, water and a leavening base but containing no leavening acid;
   (2) unexpanded portions which are derived from a second plurality of layers each containing a leavening acid but containing no leavening base; and
   (3) partially expanded dough portions which are derived from a third plurality of layers each containing flour and water but containing neither leavening acid nor leavening base, said first layers, said second layers and said third layers constituting a laminated structure in which the respective third layers intervene between the respective first layers and the respective second layers to prevent direct contact between said respective first layers and said respective second layers wherein the weight ratio of said first layers, said second layers and said third layers to the total of said first, second and third layers are 30 to 80%, 2 to 50% and 10 to 40%, respectively.

2. A fresh dough according to claim 1, wherein each second layer is a dough containing flour, water and a leavening acid.

3. A fresh dough according to claim 1, wherein each second layer consists of a leavening acid only.

4. A fresh dough according to claim 1, wherein each second layer is a gel containing at least one hydrophilic polymer, water and a leavening acid.

5. A fresh dough according to claim 4, wherein said at least one hydrophilic polymer is selected from the group consisting of carboxymethyl cellulose, locust bean gum, tamarind gum, tragacanth gum and carrageenan.

6. A fresh dough according to claim 5, wherein said at least one hydrophilic polymer is carboxymethyl cellulose.

7. A fresh dough according to any one of claims 4 to 6, wherein each second layer further contains a member selected from the group consisting of wheat gluten, microcrystalline cellulose, methyl cellulose, xanthane gum, sodium alginate, gelatin and konjak-mannan.

8. A fresh dough according to claim 7, wherein each second layer contains a member selected from the group consisting of wheat gluten and microcrystalline cellulose.

9. A fresh dough accoridng to claim 1 wherein the leavening base comprises from 1 to 5 percent by weight, based on the total weight of the flour.

10. A fresh dough according to claim 1, wherein the leavening acid is present in an amount which is substantially equivalent to that of the leavening base.

11. a fresh dough according to claim 10 having a flour/water weight ratio of from 100/40 to 100/60.

12. A fresh dough according to claim 11 which is leavened so that the internal pressure of the container, containing the fresh dough, is about 0.2 to 1.0 $kg/cm^2$ at 2° C.

* * * * *